United States Patent
Tinianov (10) Patent No.: US 7,914,914 B2
(45) Date of Patent: Mar. 29, 2011

(54) LOW EMBODIED ENERGY SHEATHING PANELS WITH OPTIMAL WATER VAPOR PERMEANCE AND METHODS OF MAKING SAME

(75) Inventor: Brandon D. Tinianov, Santa Clara, CA (US)

(73) Assignee: Serious Materials, Inc., Sunnyvale, CA (US)

( * ) Notice: Subject to any disclaimer, the term of this patent is extended or adjusted under 35 U.S.C. 154(b) by 696 days.

(21) Appl. No.: 11/772,173

(22) Filed: Jun. 30, 2007

(65) Prior Publication Data

US 2010/0077698 A1 Apr. 1, 2010

(51) Int. Cl.
*B32B 13/00* (2006.01)

(52) U.S. Cl. .......................... 428/703; 428/70
(58) Field of Classification Search ............ 428/70, 428/703
See application file for complete search history.

(56) References Cited

U.S. PATENT DOCUMENTS

| | | |
|---|---|---|
| 2,811,906 A | 11/1957 | Chappell |
| 3,160,549 A | 12/1964 | Caldwell et al. |
| 3,215,225 A | 11/1965 | Kirschner |
| 3,336,710 A | 8/1967 | Raynes |
| 3,399,104 A | 8/1968 | Ball, III et al. |
| 3,424,270 A | 1/1969 | Hartman et al. |
| 3,462,899 A | 8/1969 | Sherman |
| 3,579,941 A | 5/1971 | Tibbals |
| 3,642,511 A | 2/1972 | Cohn et al. |
| 3,700,470 A | 10/1972 | Barton et al. |
| 3,828,504 A | 8/1974 | Egerborg et al. |
| 4,003,752 A | 1/1977 | Osohata et al. |
| 4,112,176 A | 9/1978 | Bailey |
| 4,156,615 A | 5/1979 | Cukier et al. |
| 4,347,912 A | 9/1982 | Flocke et al. |
| 4,375,516 A | 3/1983 | Barrall |
| 4,402,751 A | 9/1983 | Wilde |
| 4,487,793 A | 12/1984 | Haines et al. |

(Continued)

FOREIGN PATENT DOCUMENTS

CA 2219785 10/1996

(Continued)

OTHER PUBLICATIONS

Surace, Kevin J.; U.S. Appl. No. 11/754,220, filed May 25, 2007, entitled Low Embodied Energy Sheathing Panels and Methods of Making Same.

(Continued)

*Primary Examiner* — Gwendolyn Blackwell
(74) *Attorney, Agent, or Firm* — Wilson Sonsini Goodrich & Rosati (57) ABSTRACT

Sheathing panels are produced by methods which do not require natural resources such as wood and use significantly reduced embodied energy when compared with the energy used to fabricate gypsum sheathing panels. A novel binder, consisting in one embodiment of monopotassium phosphate and magnesium oxide, and combined with various fillers, is incorporated with hollow tubes or water soluble fibers to create a gypsum board-like core which can be formed into a suitable sheathing panel handled and installed in a typical manner. The panel is manufactured to have a desirable shear resistance and water vapor permeability, important performance elements in building envelope design. The manufacturing process results in a panel that does not require mature trees as source material, does not off gas, and involves much lower greenhouse gas emissions than the processes used to make traditional wood or gypsum-based sheathing panels.

8 Claims, 7 Drawing Sheets

U.S. PATENT DOCUMENTS

| | | | |
|---|---|---|---|
| 4,618,370 | A | 10/1986 | Green et al. |
| 4,618,380 | A | 10/1986 | Alcorn et al. |
| 4,642,951 | A | 2/1987 | Mortimer |
| 4,659,385 | A | 4/1987 | Costopoulos et al. |
| 4,663,224 | A | 5/1987 | Tabata et al. |
| 4,678,515 | A | 7/1987 | Green et al. |
| 4,685,259 | A | 8/1987 | Eberhart et al. |
| 4,708,910 | A | 11/1987 | Forss |
| 4,759,164 | A | 7/1988 | Abendroth et al. |
| 4,778,028 | A | 10/1988 | Staley |
| 4,786,543 | A | 11/1988 | Ferm |
| 4,924,969 | A | 5/1990 | K'Heureux |
| 4,956,321 | A | 9/1990 | Barrall |
| 4,967,530 | A | 11/1990 | Clunn |
| 4,997,484 | A | 3/1991 | Gravitt et al. |
| 5,016,413 | A | 5/1991 | Counihan |
| 5,026,593 | A | 6/1991 | O'Brien |
| 5,033,247 | A | 7/1991 | Clunn |
| 5,063,098 | A | 11/1991 | Niwa et al. |
| 5,084,102 | A | 1/1992 | Brouns et al. |
| 5,110,660 | A | 5/1992 | Wolf et al. |
| 5,125,475 | A | 6/1992 | Ducharme et al. |
| 5,158,612 | A | 10/1992 | Savoly et al. |
| 5,240,639 | A | 8/1993 | Diez et al. |
| 5,256,223 | A | 10/1993 | Alberts et al. |
| 5,258,585 | A | 11/1993 | Juriga |
| 5,334,806 | A | 8/1994 | Avery |
| 5,342,465 | A | 8/1994 | Bronowicki et al. |
| 5,368,914 | A | 11/1994 | Barrett |
| 5,435,843 | A | 7/1995 | Roy et al. |
| 5,439,735 | A | 8/1995 | Jamison |
| 5,473,122 | A | 12/1995 | Kodiyalam et al. |
| 5,474,840 | A | 12/1995 | Landin |
| 5,502,931 | A | 4/1996 | Munir |
| 5,603,192 | A | 2/1997 | Dickson |
| 5,629,503 | A | 5/1997 | Thomasen |
| 5,643,666 | A | 7/1997 | Eckart et al. |
| 5,664,397 | A | 9/1997 | Holz |
| 5,679,452 | A | 10/1997 | Minagawa et al. |
| 5,691,037 | A | 11/1997 | McCutcheon et al. |
| 5,695,867 | A | 12/1997 | Saitoh et al. |
| 5,714,003 | A | 2/1998 | Styron |
| 5,768,841 | A | 6/1998 | Swartz et al. |
| 5,800,647 | A | 9/1998 | Andersen et al. |
| 5,824,973 | A | 10/1998 | Haines et al. |
| 5,830,815 | A | 11/1998 | Wagh et al. |
| 5,846,894 | A | 12/1998 | Singh et al. |
| 5,867,957 | A | 2/1999 | Holtrop |
| 5,910,082 | A | 6/1999 | Bender et al. |
| 5,945,208 | A | 8/1999 | Richards et al. |
| 5,954,497 | A | 9/1999 | Cloud et al. |
| 6,077,613 | A | 6/2000 | Gaffigan |
| 6,123,171 | A | 9/2000 | McNett et al. |
| 6,136,088 | A | 10/2000 | Farrington |
| 6,213,252 | B1 | 4/2001 | Ducharme |
| 6,240,704 | B1 | 6/2001 | Porter |
| 6,266,427 | B1 | 7/2001 | Mathur |
| 6,286,280 | B1 | 9/2001 | Fahmy et al. |
| 6,290,021 | B1 | 9/2001 | Strandgaard |
| 6,309,985 | B1 | 10/2001 | Virnelson et al. |
| 6,342,284 | B1 | 1/2002 | Yu |
| 6,381,196 | B1 | 4/2002 | Hein et al. |
| 6,389,771 | B1 | 5/2002 | Moller |
| 6,391,398 | B1 | 5/2002 | Pesu et al. |
| 6,391,958 | B1 | 5/2002 | Luongo |
| 6,443,256 | B1 | 9/2002 | Baig |
| 6,471,767 | B1 | 10/2002 | Konczak |
| 6,632,550 | B1 | 10/2003 | Yu et al. |
| 6,676,744 | B2 | 1/2004 | Merkley et al. |
| 6,699,426 | B1 | 3/2004 | Burke |
| 6,715,241 | B2 | 4/2004 | Gelin et al. |
| 6,716,293 | B2 | 4/2004 | Taymourian et al. |
| 6,758,305 | B2 | 7/2004 | Gelin et al. |
| 6,790,520 | B1 | 9/2004 | Todd et al. |
| 6,800,161 | B2 | 10/2004 | Takigawa |
| 6,803,110 | B2 | 10/2004 | Drees et al. |
| 6,815,049 | B2 | 11/2004 | Veeramasuneni |
| 6,822,033 | B2 | 11/2004 | Yu |
| 6,825,137 | B2 | 11/2004 | Fu et al. |
| 6,877,585 | B2 | 4/2005 | Tinianov |
| 6,913,667 | B2 | 7/2005 | Nudo et al. |
| 6,920,723 | B2 | 7/2005 | Downey |
| 6,941,720 | B2 | 9/2005 | Deford et al. |
| 7,041,377 | B2 | 5/2006 | Miura et al. |
| 7,068,033 | B2 | 6/2006 | Sellers et al. |
| 7,181,891 | B2 | 2/2007 | Surace et al. |
| 7,197,855 | B2 | 4/2007 | Della Pepa |
| 7,491,267 | B2 | 2/2009 | Francis et al. |
| 2004/0016184 | A1 | 1/2004 | Huebsch et al. |
| 2004/0025752 | A1 | 2/2004 | Sugama |
| 2004/0168853 | A1 | 9/2004 | Gunasekera et al. |
| 2004/0214008 | A1 | 10/2004 | Dobrusky et al. |
| 2005/0103568 | A1 | 5/2005 | Sapoval et al. |
| 2005/0229809 | A1 | 10/2005 | Lally |
| 2005/0252419 | A1 | 11/2005 | Mabey |
| 2006/0048682 | A1 | 3/2006 | Wagh et al. |
| 2006/0057345 | A1 | 3/2006 | Surace et al. |
| 2006/0059806 | A1 | 3/2006 | Gosling et al. |
| 2006/0108175 | A1 | 5/2006 | Surace et al. |
| 2007/0008723 | A1 | 1/2007 | Hampton |
| 2007/0009723 | A1* | 1/2007 | Ogawa et al. ............... 428/292.1 |
| 2007/0094950 | A1 | 5/2007 | Surace et al. |
| 2007/0107350 | A1 | 5/2007 | Surace et al. |
| 2008/0171179 | A1 | 7/2008 | Surace et al. |
| 2008/0286609 | A1 | 11/2008 | Surace et al. |
| 2009/0130452 | A1 | 5/2009 | Surace et al. |
| 2010/0101457 | A1 | 4/2010 | Surace et al. |

FOREIGN PATENT DOCUMENTS

| | | | |
|---|---|---|---|
| CN | 1118771 | A | 3/1996 |
| CN | 1583653 | A | 2/2005 |
| CN | 1803697 | A | 7/2006 |
| EP | 1154087 | B1 | 11/2001 |
| JP | 09-203153 | | 8/1997 |
| KR | 1996-0006226 | | 5/1996 |
| WO | WO 96/34261 | | 10/1996 |
| WO | WO 97/19033 | | 5/1997 |
| WO | WO 00/24690 | | 5/2000 |
| WO | WO 02/090292 | A2 | 11/2002 |
| WO | WO 02/090292 | A3 | 11/2002 |

OTHER PUBLICATIONS

Noise and Vibration Control Engineering: *Principles and Applications*, Edited by Leo Beranek and Instvan Ver, Chapter 11, John Wiley & Sons, Inc., 1002, (12 pages).

Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).

"Green Glue is your soundproofing solution and noise reduction material", www.greengluecompany.com (2 pages).

Acoustical: *A Sound Approach to Testing*, www.archest.com/pages (2 pages).

STC—*Sound Transmission Class—Discussion And Use*, www.sota.ca/stc_info.htm (3 pages).

ASTM International, Designation: C 1396/C 1396M-04, *Standard Specification for Gypsum Board* (7 pages).

Barbara C. Lippiatt, National Institute of Standards and Technology. BEES 3.0, "*Building for Environmental and Economic Sustainability* Technical Manual and User Guide", Oct. 2002, (198 pages).

Takada, et al., *Effect in Reducing Floor Impact Noise Of Recycled Paper Damper Members*, Bulletin of Tokyo Metropolitan Industrial Technology Research Institute, No. 2 (1999) [certified English translation] (13 pages).

*Architectural Acoustics*, M. David Egan, J. Ross Publishing (Reprint 2007) p. 211; originally published McGraw-Hill, 1988 (5 pages).

Hastings, Mardi C.; Godfrey, Richard; Babcock, G. Madison, *Application Of Small Panel Damping Measurements To Larger Walls*, Proc. SPIE vol. 2720, p. 70-76, Smart Structures and Materials 1996: Passive Damping and Isolation (7 pages).

van Vuure, A.W.; Verpoest, I., Ko, F.K., *Sandwich-Fabric Panels As Spacers In A Constrained Layer Structural Damping Application*, Composites Part B 32 (2001) 11-19, Elsevier Science Ltd. (9 pages).

Noise and Vibration Control, Revised Edition, pp. 306-315, Institute of Noise Control Engineering, 1988, Beranek, Leo L. (editor) (9 pages).

Noise and Vibration Control, Chapter Fourteen, *Damping Of Panels*, Ungar, Eric E., pp. 434-473, McGraw-Hill, 1971, Beranek, Leo L. (editor) (7 pages).

Noise and Vibration Control Engineering, *Principles And Application*, pp. 466-479, John Wiley & Sons, 1992, Beranek, Leo L. and Ver, Istvan L. (editors) (9 pages).

Nashif, Ahid D.; Jones, David I. G.; Henderson, John P., *Vibration Damping*, pp. 290-305, John Wiley & Sons, 1985 (18 pages).

Architectural Acoustics, Principles and Practice, John Wiley & sons, 1992, Cavanaugh, William J. and Wilkes, Joseph A. (editors) (332 pages).

FIRE Resistance Design Manual, Sound Control, Gypsum Association, GA-600-94 (14$^{th}$ Ed.) (107 pages).

FIRE Resistance Design Manual, Sound Control, Gypsum Association, GA-600-97 (15$^{th}$ Ed.) (120 pages).

FIRE Resistance Design Manual, Sound Control, Gypsum Association, GA-600-2000 (16$^{th}$ Ed.) (139 pages).

Noxon, Arthur M., *The Chain Is As Strong As Its Weakest Link*, An article written for the first Hong Kong HiFi Show, 1993, Translated and Published in Chinese, http://www.acousticsciences.com/articles/chain.htm (7 pages).

*Quiet Lightweight Floor Systems*, Reprint from Sound and Vibration Magazine, Jul. 1992, by David A. Harris, Building & Acoustic Design Consultants (7 pages).

Joyal, Brian, *Constrained-Layer Systems Provide Weight-Efficient, High Level Damping* (4 pages).

Dynamat materials http://web.archive.org/web/20010525113753/www.admteschusa.com/Dynamat.html Jun. 12, 2007, ADM Tech—Dynamic Control (15 pages).

Noise Killer: Pro Damping Compound Materials http://www.tnt-audio.com/clinica/noise.html May 18, 2007, 1998 (3 pages).

WAYBACKMACHINE search results for Jan. 1, 1996-Jun. 12, 2007 (1 page).

Frankovich, David, *The Four-Fold Method Of Noise And Vibration Control* (8 pages).

Renninger, Jennifer, *Understanding Damping Techniques For Noise And Vibration Control* (8 pages).

Unified Facilities Criteria (UFC) *Noise And Vibration Control*, UFC 3-450-01. May 15, 200, Department of Defense (156 pages).

United States Gypsum, *Architectural And Construction Services, Design Data For Acousticians*, Feb. 1986 (4 pages).

*A Study Of Techniques To Increase The Sound Of Insulation Of Building Elements*, Wyle Laboratories, Prepared for Dept. Of Housing and Urban Development, Jun. 1973 (12 pages).

dB-Ply materials Sound Reducing Panels from Greenwood Forest Products, Inc., Apr. 24, 1997 (9 pages).

dB-Rock materials OMNI Products, Inc. (3 pages).

ASC WallDamp materials from Acoustic Sciences Corporation http://web.archive.org/web/20021013031149/www.asc-soundproof.com/index-walldamp . . . May 18, 2007 (21 pages).

Sounddown Viscoelastic Glue DG-A2, Soundown Corporation (2 pages).

Nordisk Akustik A/S materials, http://web.archive.org/web/200206240933724/www.nordisk-akustik.dk/html_uk/prod03.ht . . . Jun. 11, 2007 (4 pages).

IES 2000 *Dampening And Visocelastic Membranes* (Jul. 2, 2003) Atlanta.com/product (pp. 1-6).

WAYBACKMACHINE search results for Jan. 1, 1996-May 3, 2006 (1 page).

"*Damping of plate flexural vibrations by means of viscoelastic laminae*"By D. Ross, E.E. Ungar, and E.M. Kerwin—Structural Damping, Section III, ASME, 1959, New York (41 pages).

Vandersall, H. L.,"*Intumescent Coating Systems, Their development and Chemistry*"J. Fire & Flammability, vol. 2 (Apr. 1971) pp. 97-140 (45 pages).

U.S. Appl. No. 11/652,991, filed Jan. 11, 2007, by Surace et al., entitled"Low Embodied Energy Wallboard And Method Of Making Same"(20 pages of Specification, Claims and Abstract and 2 sheets of drawings).

English Language Abstract, JP Patent First Publication No. 09-203153, Aug. 5, 1997, (2 pages).

*A Study Of Techniques To Increase The Sound Of Insulation Of Building Elements*, Wyle Laboratories, Prepared for Dept. of Housing and Urban Development, Jun. 1973 (16 pages).

*Field Sound Insulation Evaluation Of Load-Beating Sandwich Panels For Housing*, Final Report, Prepared by Robert E. Jones, Forest Products Laboratory, Forest Service, U.S. Department of Agriculture, Aug. 1975 (53 pages).

*Sound Studio Construction On A Budget*, F. Alton Evererst, McGraw-Hill, 1997 (7 pages).

*Wood Handbook/Wood as an Engineering Material*, United States Department of Agriculture, Forest Service, General Technical Report FPL-GTR-113, Mar. 1999 (24 pages).

*Transmission Loss Of Plasterboard Walls* by T. D. Northwood, Building Research Note, Division of Building Research, National Research Counsel, Ottawa, Canada (10 pages).

*A Guide to Airborne, Impact, and Structureborne Noise Control In Multifamily Dwellings*, U. S. Department Of Housing And Urban Development, Prepared for the National Bureau Of Standards, Washington, D. C., Jan. 1963 (5 pages).

*Transmission Loss Of Leaded Building Materials*, Paul B. Ostergaard, Richmond L. Cardinell, and Lewis S. Goodfriend, The Journal Of The Acoustical Society Of America, vol. 35, No. 6, Jun. 1963 (7 pages).

*Dictionary Of Architecture & Construction 2200 illustrations*, Third Edition, Edited by Cyril M. Harris, Professor Emeritus Of Architecture Columbia University, McGraw-Hill, 2000 (7 pages).

*Dictionary Of Engineering Materials*, Harald Keller, Uwe Erb, Wiley-Interscience by John Wiley & Sons, Inc. 2004 (4 pages).

*Chamber Science and Technology Dictionary*, by Professor Peter M. B. Walker, W & R Chambers Ltd and Cambridge University Press, 1988 (3 pages).

International Search Report in corresponding International Application No. PCT/US08/63747 dated Aug. 6, 2008 (2 pages).

Notification of Transmittal of the International Search Report in corresponding International Application No. PCT/US08/63747 dated Aug. 6, 2008(1 page).

Written Opinion of the International Searching Authority in corresponding International Application No. PCT/US08/63747 dated Aug. 6, 2008 (9 pages).

International search report dated May 27, 2009 for PCT Application No. US2008/83463.

Walker, M.B., General Editor. Chambers Science and Technology Dictionary. W&R Chambers Ltd and Cambridge University Press; 1988:954.

\* cited by examiner

LOW EMBODIED ENERGY SHEATHING PANELS WITH OPTIMAL WATER VAPOR PERMEANCE AND METHODS OF MAKING SAME

FIELD OF INVENTION

The present invention relates to new compositions and methods of manufacture for structural sheathing panels and in particular to panels and processes which reduce the energy required to manufacture such structural sheathing panels when compared to the energy required to manufacture traditional gypsum or wood-based structural sheathing panels.

BACKGROUND OF THE INVENTION

In the field of building construction, structural sheathing is a crucial element in suitable building design. Structural sheathing may serve many functions associated with the purpose and integrity of the assembly, including strengthening the building to lateral forces; providing a base wall to which finish siding can be nailed; acting as thermal insulation; and, in some cases, acting as a base for further thermal insulation. Structural sheathing, in the form of thin, rigid panels, is nailed directly onto the framework of the building. Some common types of sheathing include wood boards or slats, oriented strand board (OSB) panels, plywood panels, and gypsum panels.

Before the acceptance of performance-rated cellulose panels such as oriented strand board (OSB), plywood was the sheet product of choice for constructing wood shear walls. Plywood panels are very flexible and appropriate for a variety of building designs. The panel thickness, panel grade, nail type, and nail spacing could be combined in different ways to achieve a wall with the right design strength. In the 1970s, with the advent of performance-rated products based on waferboard technology, plywood was largely replaced with composite wood panels such as OSB. Today, all of the model building codes in the United States and Canada recognize OSB panels for the same uses as plywood on a thickness-by-thickness basis and they are used interchangeably, based on price and availability.

More recently, gypsum sheathing panels have been used as structural sheathing panels. Gypsum sheathing is most commonly manufactured with a water-resistive treated core but may also be available in a non-treated core. Treated core gypsum sheathing is intended for use as a substrate sheathing under a variety of exterior wall claddings in any climate. Non-treated core gypsum sheathing is intended for use only in dry climates. As with their wood counterparts, both types of gypsum sheathing (i.e. treated core and non-treated core) are designed to be mechanically attached to the outside surface of exterior wall framing using either nails, or screws, or staples. Gypsum sheathing is manufactured in a range of lengths and widths similar to those of both plywood and OSB.

The sheathing layer is designed with several system properties and requirements in mind. Of particular importance are the shear resistance imparted by the layer, the water vapor permeance of the layer, the weather resistance of the layer, and finally, the environmental impact (and associated greenhouse gases) involved with the manufacture of the sheathing layer. First, an appropriate structural building design requires that the panel reliably transfer shear forces (typically from wind shear or earthquake loads) from the body of the structure to its foundation. The performance of a panel in a building design is subject to many design elements including the material's Young's modulus, the panel thickness, the type and configuration of the structural framing and the type and spacing of the panel fasteners. All of these combine for a rated shear resistance in units of pounds per foot (lb/ft). Materials are tested via American Society of Testing and Materials (ASTM) test methods E2126 or E564. Further information may be found on the Internet at http://www.astm.org.

A second, important material property of the sheathing panel is the panel's role in the moisture management across the building envelope. The problems associated with excessive moisture in building wall cavities and the resulting mold growth, are well documented in the national outcry over unhealthy buildings and poor indoor air quality. As a result, building science has established best practices for minimizing the probability of mold growth in buildings. Walls between areas of differing temperature are the primary structures for these problems. Preventing condensation is of particular importance with regard to the exterior walls of homes or other buildings, where temperature extremes are likely to be greater than between interior walls. Wetting of exterior building surfaces and rainwater leaks are major causes of water infiltration, but so is excessive indoor moisture generation. Moisture may be present within a structure due to occupancy and use by humans, use of wet materials during construction, air leaks, or transfer from external wall materials.

A figure of merit for the measurement of the transport of water vapor across a component such as a panel or a wall assembly, is its permeance, or "perms". One perm is defined as the transport of one grain of water per square foot of exposed area per hour with a vapor pressure differential of 1-inch of mercury (Hg). Vapor pressure is a function of the temperature and relative humidity (RH) of the air to which a test structure is exposed, and may be found in many standard data tables. The vapor pressure at any certain RH is found by the product of the RH and the vapor pressure for saturated air at a certain temperature. For example, at 70 degrees Fahrenheit the saturated vapor pressure is 0.7392 Hg and the vapor pressure at fifty per cent RH is 0.3696. The testing methodology varies depending upon the subject material. Data presented for sheathing panel products is typically taken using the ASTM E96 "dry cup" method. Further information may be found on the Internet at http://www.astm.org.

The Department of Energy (DOE) and the American Society of Heating, Refrigeration, and Air-Conditioning Engineers (ASHRAE) and other building science organizations have established recommended wall designs that specify the proper location of a vapor retarder within the wall. A vapor retarder is defined by the building codes as a material having a permeance rating of 1.0 or less. Wall designs are dependant upon the regional climate of the building. In cooling-dominated climates, it is recommended that a vapor retarder be installed on the exterior of the thermal insulation—at the typical location of the structural sheathing. In hot and humid climates, such as along the Gulf coast and in Florida, the vapor barrier should be placed in this exterior location in the wall. Conversely, in heating dominated climates it is recommended that a vapor retarder be installed on the interior side of the thermal insulation—against the interior wallboard. In mixed zones, climates with both significant heating and cooling requirements, design recommendations suggest the omission of the vapor retarder altogether. If these guidelines are not observed, the structure is at risk of allowing water vapor condensation within the wall cavity and eventual water damage and mold growth. To avoid such an outcome, one must know the permeability of the wall components and use only appropriate materials.

For example, the rate of water vapor transmission of OSB is approximately two (2) perms. For sheathing grade plywood, of ½ to 1 inch thickness, the transmission rate is approximately ten (10) perms. Gypsum sheathing typically has an average vapor permeance of approximately twenty (20) perms. Therefore, plywood and gypsum are above the accepted minimum water vapor transmission rate of five (5) perms specified for a wall with a "U" value less than 0.25 and a vapor retarder not exceeding one (1) perm installed on the interior side of the framing. A double vapor retarder condition is avoided. However, OSB would be deemed unacceptable in the same assembly.

A third important material feature is weather resistance. Gypsum sheathing is designed for use as a substrate that is covered by an exterior wall cladding. Local weather conditions will dictate the length of time gypsum sheathing may be left exposed; however, it should perform satisfactorily if exposed to the elements for one month or less. Treated core gypsum sheathing should be covered immediately with a weather-resistive barrier, such as building felt or equivalent, if exposure time will exceed one month or weather conditions will be severe. Plywood can typically endure a similar period of weather exposure, while OSB can not. Non-treated core gypsum sheathing should be covered immediately after installation with a weather-resistive barrier. Gypsum sheathing does not hold peel and stick water barrier well.

Another final important consideration in the design and manufacture of construction materials is their potential negative environmental impact. Environmental impact can take many forms including the depletion of non-renewable natural resources (such as fossil fuels, for example), the generation of harmful chemicals or compounds, or the creation of greenhouse gasses. For a complete assessment as to the long term suitability of a construction material, the existing offering of sheathing materials should be considered in this context as well.

Unfortunately, the structural integrity of plywood is dependent upon the inclusion of quality wood laminates harvested from mature, large diameter trees, at least 30 years old. Their manufacture puts stress on old growth forests and existing woodland areas. As a result, much of the U.S. softwood plywood industry has shifted from the Pacific Northwest to the South and Southeast, to pine plantations on private lands. These small pines produce a lower quality panel than from the previously abundant older trees. In addition, their costs have risen over the last decade, making them less desirable as a mainstay construction material. OSB has at least two distinct advantages over traditional plywood panels. First, they do not require old growth forests, or decades old trees for their manufacture. OSB is derived from younger aspen trees of a much smaller relative diameter. Although the aspen wood is not a rapidly renewable resource, it does lessen the OSB's impact of endangered woodlands. Second, OSB extends the use of potentially dangerous resins such as phenol formaldehydes listed by the International Agency for Research on Cancer (IARC) as a potential carcinogen that may be released as an undesirable volatile organic compound (VOC) during the OSB's service life.

Gypsum sheathing panels do not require the use of wood and therefore do not share the concerns associated with tree harvesting. Instead, the manufacture of gypsum sheathing represents an astounding amount of embodied energy as a construction material. The term 'embodied energy' is defined as "the total energy required to produce a product from the raw materials stage through delivery" of finished product. Several of the steps (drying gypsum, calcining gypsum (dehumidification), mixing the slurry with hot water and drying the manufactured boards) involved in the manufacture of gypsum sheathing take considerable energy. Greenhouse gasses, particularly $CO_2$, are produced from the burning of fossil fuels and the calcining of certain materials, such as gypsum. Thus the gypsum manufacturing process generates significant amounts of greenhouse gasses due to the requirements of the process.

According to the National Institute of Standards and Technology (NIST—US Department of Commerce), specifically NISTIR 6916, the manufacture of gypsum sheathing panel requires 8,196 British Thermal Units (BTU) per pound. With an average ⅝' gypsum sheathing board weighing approximately 75 pounds, this equates to over 600,000 BTU's per board total embodied energy. Other sources suggest that embodied energy is less than 600,000 BTU's per board, while others suggest it may be even more. It has been estimated that embodied energy constitutes over 50% of the cost of manufacture. As energy costs increase, and if carbon taxes are enacted, the cost of manufacturing sheathing panel from calcined gypsum will continue to go up directly with the cost of energy. Moreover, material producers carry the responsibility to find less-energy dependent alternatives for widely used products as part of a global initiative to combat climate change.

For comparison, the same energy study (NISTIR 6916) found that a total of 18600 BTU's per panel are required for the wood harvesting and manufacture of plywood sheathing. OSB sheathing requires a similar amount of energy in its manufacture. Report NISTIR 6916 calculated 27100 BTU's per panel for OSB sheathing.

In summary, a product's potential negative environmental impact can take many forms, including a depletion of natural resources such as trees, potable water and materials in short supply, or the negative impact may be in the form of a significant consumption of energy during the product's manufacture and the resulting generation of greenhouse gases from its production.

Thus, it would be highly desirable to meet all of the performance requirements of a structural sheathing panel while reducing the environmental impact of its manufacture by reducing the harvesting of trees, reducing the use of harmful chemicals, and reducing the generation of dangerous greenhouse gases via a high embodied energy.

SUMMARY OF INVENTION

In accordance with the present invention, new methods of manufacturing novel sheathing panels (defined herein as "EcoRock™" sheathing panels), are provided. The resulting novel EcoRock sheathing panels can replace plywood, OSB, and gypsum sheathing panels in most construction applications. Sheathing panels formulated and manufactured in accordance with this invention maintain the structural integrity, water vapor permeance, and weather resistance required for building applications. Water vapor permeance is enabled and controlled by the introduction of one or more of various filler fibers. These fibers may be hollow glass fibers and/or alternatively, water soluble fibers. These crucial performance features are maintained while significantly reducing the environmental impact associated with the other existing sheathing materials, thus substantially reducing future harm to the environment.

This invention will be fully understood in light of the following detailed description taken together with the drawings.

DETAILED DESCRIPTION

The following detailed description of embodiments of the invention is illustrative only and not limiting. Other embodiments will be obvious to those skilled in the art in view of this description. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. Various changes in the details may be made without departing from the spirit, or sacrificing any of the advantages of the present invention. The detailed descriptions below are designed to make such embodiments obvious to a person of ordinary skill in the art.

The novel processes and materials described herein for manufacturing a low embodied energy sheathing panel lessen the environmental impact created by traditional processes and materials. In comparison to wood products (such as plywood and OSB) there is no depletion of trees as a natural resource. As an alternative to gypsum, the disclosed processes eliminate the most energy intensive prior art processes in the manufacture of current gypsum sheathing panels such as gypsum drying, gypsum calcining, the generation of hot water, and board drying. The new processes allow a sheathing panel to be formed from non-calcined materials which are plentiful and safe and which can react naturally to form a strong, shear resistant board that is also weather hardy and with acceptable water vapor permeability.

The new EcoRock sheathing panel contains a binder of one or more of magnesium oxide (MgO), calcium oxide, calcium hydroxide, iron oxide (Hematite or Magnetite) and a solution of alkali phosphate salt (sodium phosphate, potassium phosphate, monopotassium phosphate, tripotassium phosphate, triple super phosphate, calicium dihydrogen phosphate, dipotassium phosphate or phosphoric acid). The selected binder materials, often in conjunction with fillers, are mixed together at the start of the particular EcoRock manufacturing process or processes selected to be used to form the EcoRock sheathing panel or sheathing panels. Prior to the addition of liquids, such as water, this mix of binder and filler powders is termed a "dry mix." The MgO may be calcined or uncalcined. However uncalcined MgO may be less expensive and provide significant energy savings over calcined MgO. Thus there is no need to use calcined MgO, even though calcined MgO can be used in the EcoRock sheathing panel processes.

In U.S. patent application Ser. No. 11/652,991 Surace et al. describe novel interior gypsum wallboard replacements using such an EcoRock formulation. While there are many binder ingredients in the Surace et al. panels similar to the binder ingredients used in the present EcoRock sheathing panel, the present sheathing panel as intended for use in building construction has features which optimize the water vapor transmission of the panel, a property which is an important characteristic of sheathing panels. This water vapor transmission capability is not present in the Surace et al. panels.

Many different configurations of materials are possible in accordance with this invention, resulting in improved strength, hardness, score/snap capability, paper adhesion, thermal resistance, weight, and fire resistance. The binder is compatible with many different fillers including calcium carbonate ($CaCO_3$), wolastinite (calcium silicate,) cornstarch, ceramic microspheres, perlite, flyash, waste products and other low-embodied energy materials. Uncalcined gypsum may also be used as a filler material. By carefully choosing low-energy, plentiful, biodegradable materials as fillers, such as those listed above, the sheathing panel begins to take on the best characteristics of wood-based and gypsum sheathing panels. These characteristics (structural strength, acceptable weight so as to be able to be carried, water vapor permeability, and the ability to be nailed or otherwise attached to other materials such as studs) are important to the marketplace and may be required to make the product a commercial success as a traditional sheathing panel replacement.

Calcium carbonate ($CaCO_3$), an acceptable alternate filler material, is plentiful and represents an environmentally favorable choice. Cornstarch, made from corn, is plentiful and non toxic. In addition, ceramic microspheres are a waste product of coal-fired power plants, and can reduce the weight of materials as well as increase thermal and fire resistance of the sheathing panels that incorporate these materials. The dry mix can include up to 60% by weight of ceramic microspheres. Such a dry mix may be successfully incorporated in EcoRock sheathing panels. Concentrations of greater than sixty percent (60%) by weight of ceramic microspheres in the dry mix increase cost and can reduce strength below acceptable levels. Fly ash is also a waste product of coal-fired power plants which can be effectively utilized in the dry mix. The dry mix can include up to 80% by weight of fly ash. Such a dry mix has been successfully incorporated into EcoRock sheathing panels; however very high concentrations of fly ash can increase weight, darken the core color, and harden the core beyond a level that may be desirable. Biofibers (i.e. biodegradable plant-based fibers) are used for tensile and flexural strengthening in this embodiment; however other fibers, such as cellulose or borosilicate glass fibers, may also be used. The use of specialized fibers in cement boards is disclosed in U.S. Pat. No. 6,676,744 and is well known to those practicing the art.

In a preferred embodiment of the present invention, a dry mix of powders plus water is created using the materials listed in TABLE 1 by both volume and weight:

TABLE 1

| Material | % Volume | % Weight | Notes |
|---|---|---|---|
| Oxide | 7.0% | 5.4% | Magnesium Oxide |
| Phosphate | 13.0% | 16.0% | Monopotassium Phosphate |
| Filler | 11.% | 12.0% | Calcium Silicate |
| Fibers | 2.0% | 0.50% | Biofibers |
| Lightener | 32.0% | 30.0% | Microspheres |
| Retarder | 0.20% | 0.20% | Boric Acid |
| Water | 34.8% | 35.9% | Water |

Monopotassium phosphate and magnesium oxide together form a binder in the slurry and thus in the to-be-formed core of the EcoRock sheathing panel. Calcium carbonate, cornstarch and ceramic microspheres form a filler in the slurry while the biofibers strengthen the core, when the slurry has hardened. Boric acid is a retardant to slow the exothermic reaction and thus slow down the setting of the slurry.

In terms of manufacturing steps, the water, equivalent to about thirty six (36%) of the dry mix by weight, is added to the dry mix to form a slurry. The wet mix (termed the "initial slurry") is mixed by the mixer in one embodiment for three (3) minutes. Mixers of many varieties may be used, such as a pin mixer, provided the mix can be quickly removed from the mixer prior to hardening.

In order to meet all of the sheathing material requirements, the bulk EcoRock may not have a water vapor permeability acceptable for all wall designs. For this reason, several embodiments of the invention involve fibers or tubes that allow for transmission of water vapor from one surface of the panel to the opposite surface. The tubes can be observed as a number of pores across the panel from one surface to the other surface. A representation of such a porous surface is shown in FIG. 1 in a perspective view.

Figure 1:
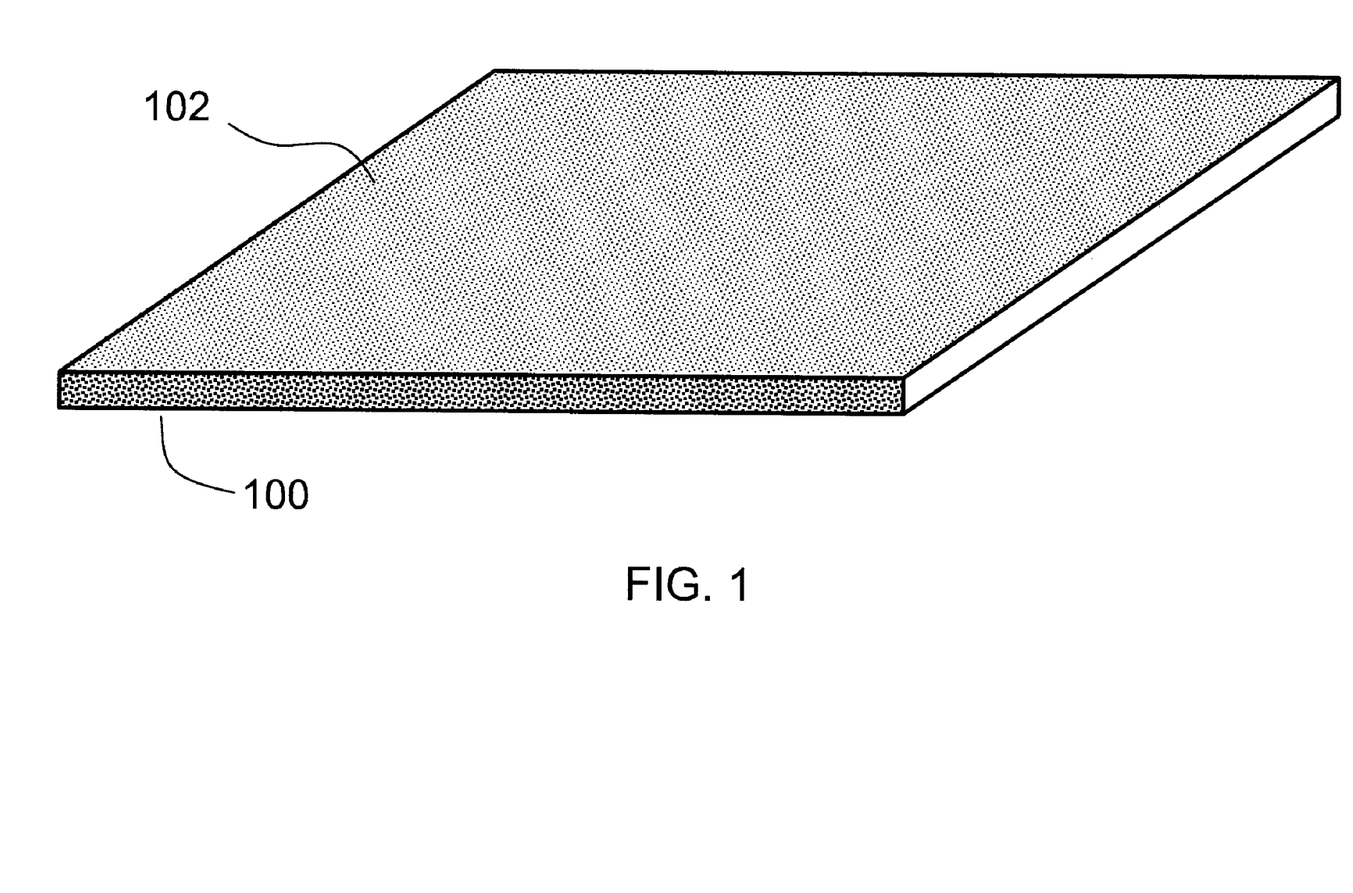
FIG. 1 is a perspective view of a sheathing panel according to a preferred embodiment of the invention.

FIG. 1 shows a proposed embodiment of the present invention whereby the novel cement mixture is formed into water vapor permeable panels. Panel 100 is of typical construction panel dimensions of approximately 4 feet by 8 feet by ⅝ inch thick, or 4 feet by 12 feet by 1 inch thick, or another set of dimensions typical to the construction industry. The panel 100 features an array of through penetrations (pores) 102 with a prescribed hole diameter and spacing to ensure the proper water vapor transmission while maintaining the structural integrity of panel 100. Example hole counts are from 50 to 5000 per 4 foot by 8 foot panel. The diameter of the holes ranges from 0.2 mm to 2 mm.

Figure 2:
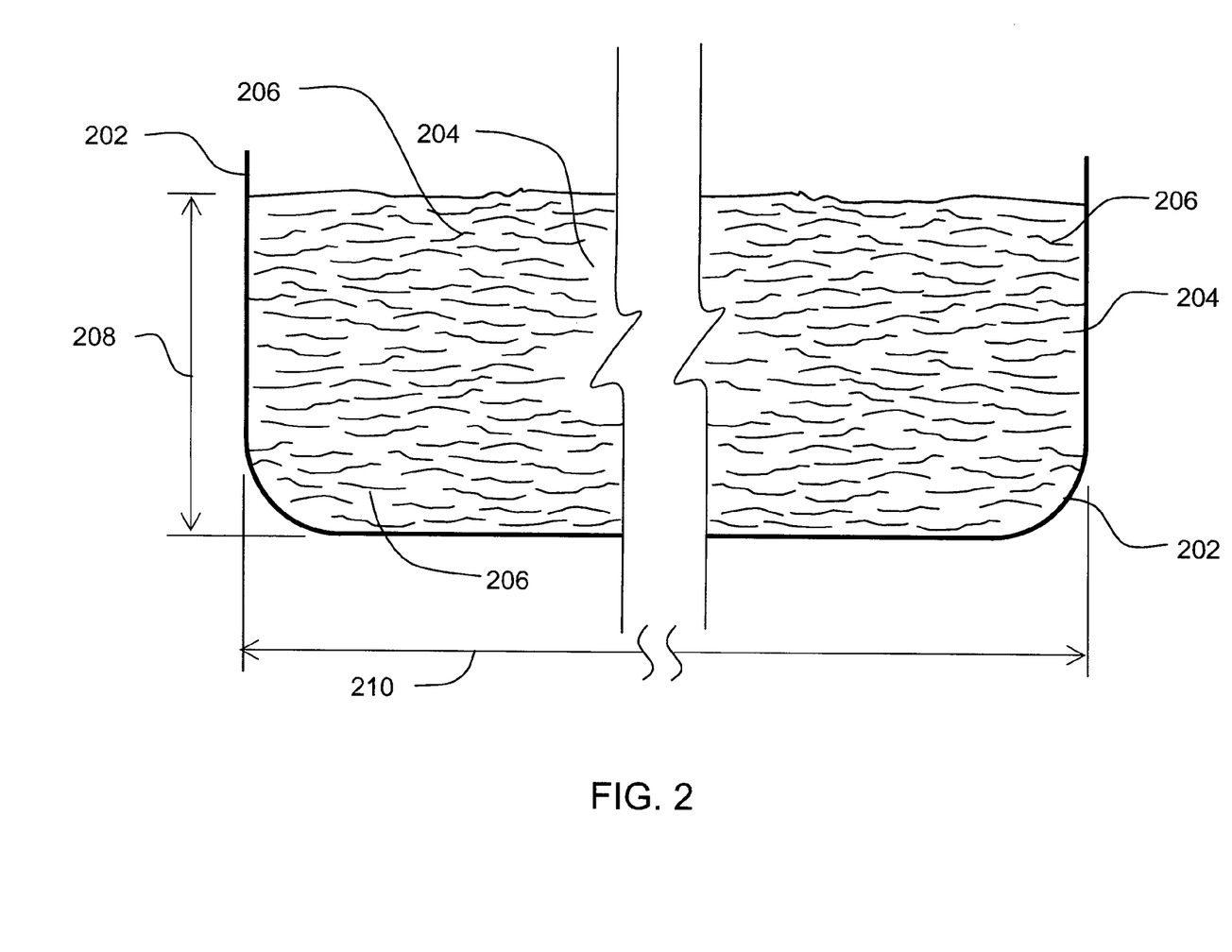
FIG. 2 shows an EcoRock sheathing slurry tank 202 with fibers 206 oriented in a preferential direction to allow for optimal water vapor transmission following manufacture.

FIG. 2 shows a proposed embodiment of a manufacturing step for production of panel 100. A cement slurry 204 is poured into a forming tank 202. The slurry 204 contains a prescribed number or amount of hollow or soluble fibers 206. The liquid cement mixture is allowed to cure in the forming tank 202. The dimensions of the tank are chosen to optimize the manufacturing efficiency and yield of construction panels of typical dimensions from approximately 2 feet by 8 feet to approximately 4 feet by 12 feet. In one embodiment, the tank dimensions could be a height 208 of 26 inches by a width 210 of 97 inches, by tens of feet long, depending only on the total weight constraints. The fibers 206 may be of various lengths and diameters. They may also be straight or bent or curled along their length. In one embodiment, the fibers 206 consist of hollow glass tubes approximately 60 mm long with an inside diameter of 200 microns. Such tubes are available from Accu-Glass of St. Louis, Mo. In another embodiment, the fibers 206 are glass tubes about 150 mm long with an inside diameter of about 1 mm. These tubes are also available from Accu-Glass of St. Louis, Mo. In another embodiment, the fibers 206 may consist of a soluble polymer 60 mm long and 200 microns in diameter. Soluble Polymer fibers are disclosed in U.S. Pat. Nos. 3,066,999, 3,689,469, 4,942,089, 5,181,966, 5,187,226, 6,780,832 and 7,001,976 and U.S. published application No. WO/2003/097703. In another embodiment, the fibers 206 are approximately 150 mm long and approximately 1 mm in diameter. In another embodiment, the fibers 206 may consist of a material such as paraffin with a melting point below 200 degrees Celsius, approximately 60 mm long and approximately 200 microns in diameter. In another embodiment, the fibers are made from another soluble material such as starch as disclosed in U.S. Pat. No. 4,853,168. The low melting point fiber material may be paraffin, olefin, PVA, or another similar material. Many different fiber lengths and fiber diameters are possible in accordance with this invention.

Figure 2A:
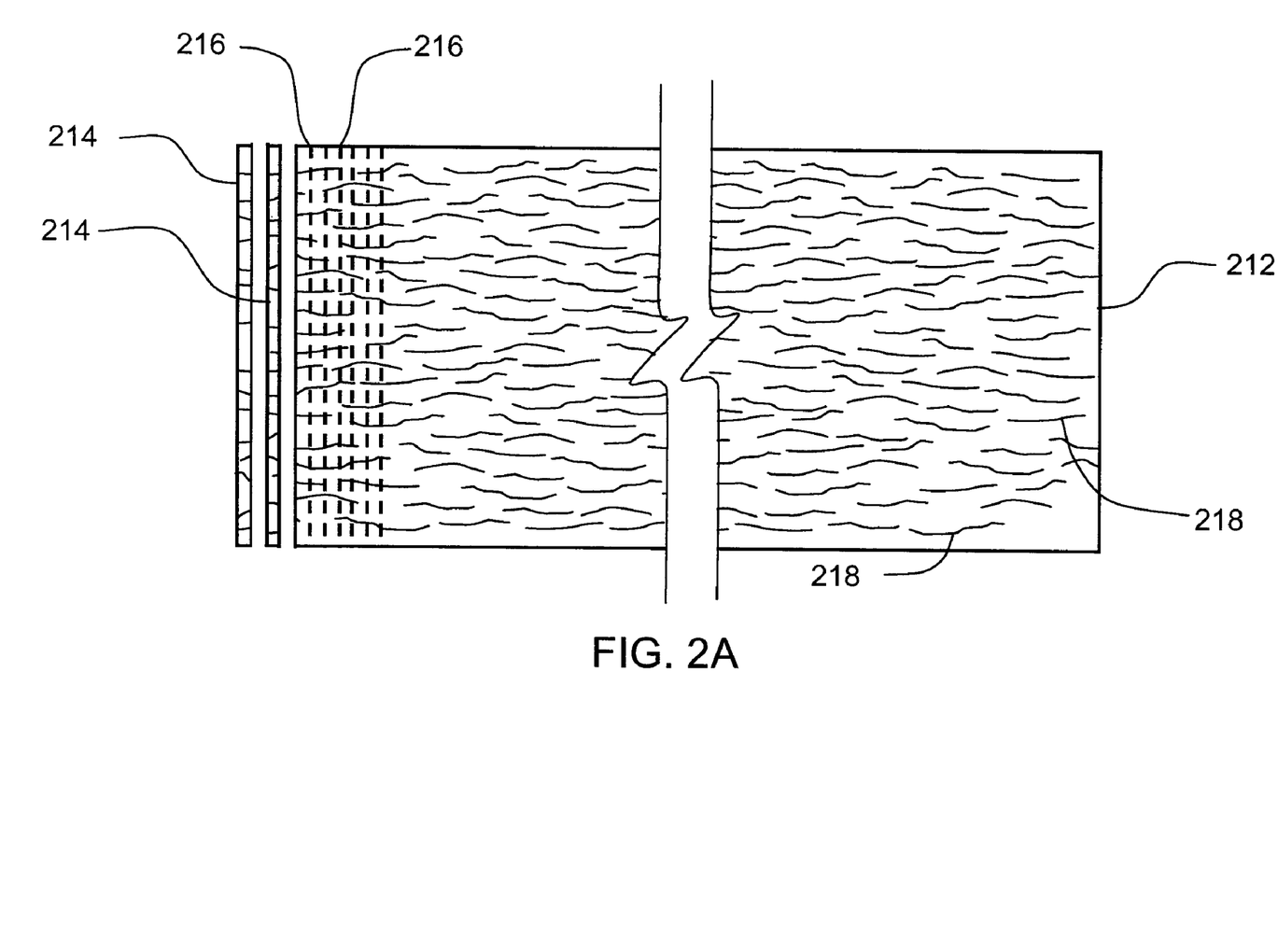
FIG. 2A shows a cured EcoRock sheathing brick 212 being cut into slices to create a series of panels with optimal water vapor transmission.

FIG. 2A shows the cured cement mixture as a single large ingot 212 following extraction from the forming tank. Individual sheathing panels 214 are created by slicing the ingot at prescribed intervals 216. The interval distance is selected according to the desired panel thickness. It is important to note that the panels 214 have fibers 218 oriented in parallel with the thickness dimension (i.e. the fibers extend through each panel from one surface to the other surface). This allows for transport of water vapor.

Figure 3:
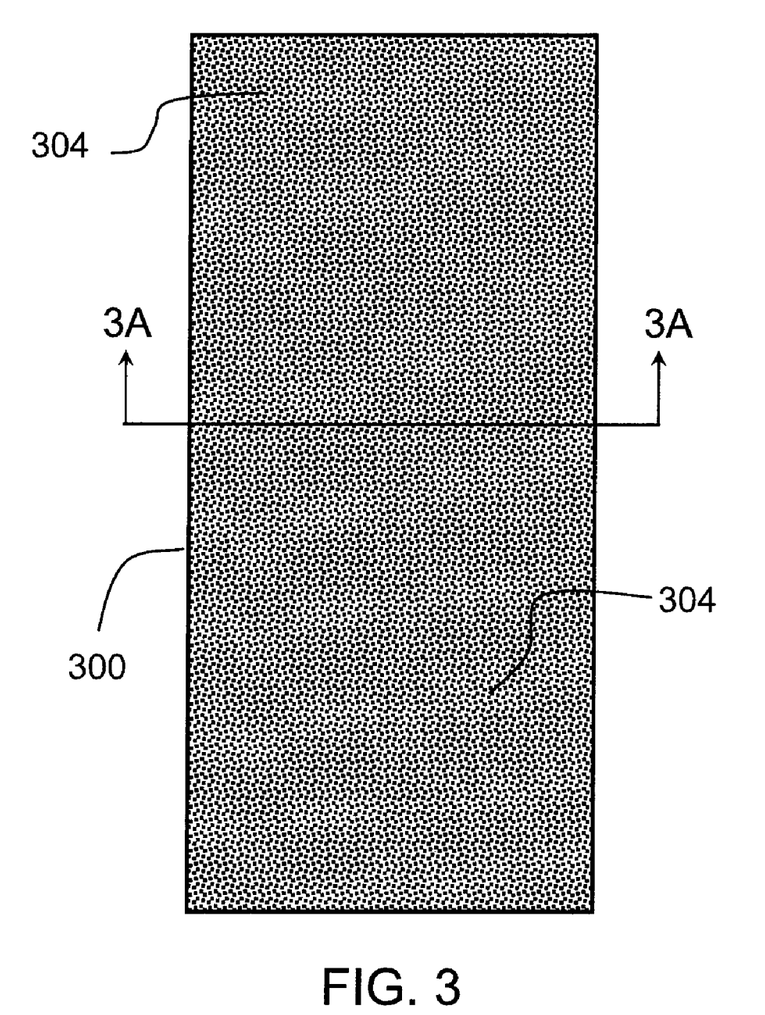
FIGS. 3 and 3A show an EcoRock sheathing panel 304 molded as a continuous slab designed for further fabrication steps to allow for optimal water vapor transmission and a cross-section of this panel, respectively.
Figure 3A:
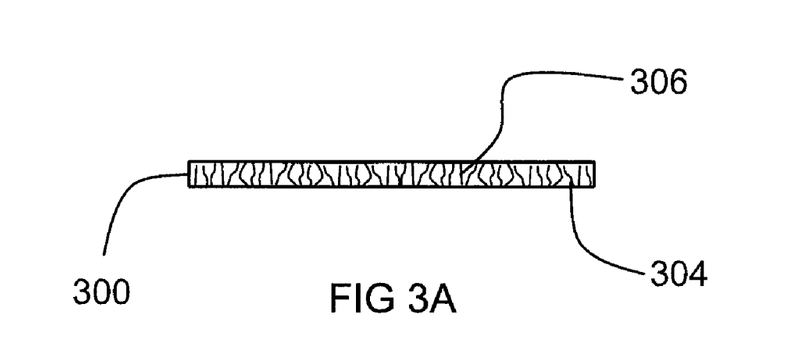

One resulting panel is shown in FIG. 3. The extended surfaces of sheathing panel 300 show a large number of pores 304. These are the exposed ends of the filler hollow tubes or soluble fibers 306. The holes are again of a number and diameter according to the preferred panel permeance of 10-20 perms without allowing the transmission of liquid water. Practical hole diameters range from 0.2 to 2 mm. The panel is shown in cross section in FIG. 3A where the holes 304 and traversing fibers 306 are visible.

Figure 4:
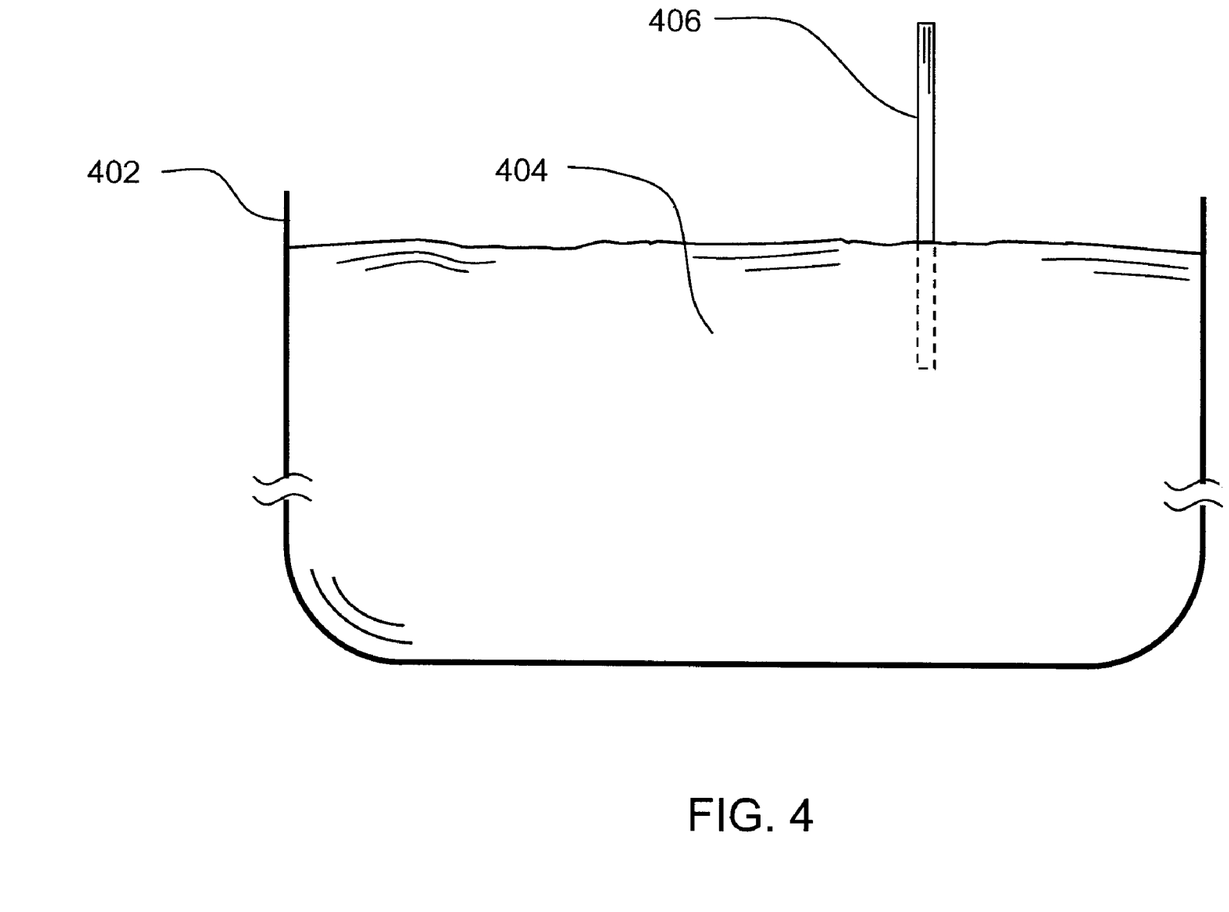
FIG. 4 shows an EcoRock molded sheathing panel 406 lowered into a liquid bath to dissolve the embedded liquid soluble fibers.

If the fibers consist of a soluble material such as a water soluble polymer, the panel must be dipped in a liquid bath for a selected time to dissolve the fibers. In one embodiment, the fibers are water soluble and the solvent liquid is water. This process is shown in FIG. 4 where a liquid bath 402, a dissolving liquid (water) 404 and the sheathing panel to be treated 406 are shown in relationship to each other. The panel may be dipped for a time range from seconds to days depending upon the soluble polymer, the solvent liquid, and the physical arrangement (e.g. number and diameter) of the fibers. Alternately, the panels may pass horizontally through a liquid shower or mist as necessary. The panels are fabricated of such materials that dipping the panels in water does not degrade the structural integrity of the panels after the water soluble polymer has been dissolved. A suitable fiber that is currently commercially available is one made from polyvinyl alcohol (PVA). These fibers are available from multiple suppliers of polyvinyl alcohol (PVA) including Sinopec Shanghai Petrochemical Company Limited of Shanghai, China, Nantong Yimian Textile Co., Ltd. of Jiangsu, China, Texchem Materials of Subang Jaya, Malaysia, Kuraray Co., Ltd. of Osaka, Japan and others. PVA fibers are in common use in carpets and textiles. Their typical water dissolution temperature is from 20 to 90 degrees Celsius with a dissolving time of several minutes to several hours, depending on their particular chemistry and geometry.

The processing of the slurry may occur using several different techniques depending on a number of factors such as quantity of boards required, manufacturing space and familiarity with the process by the engineering staff. An example of such a process is given in FIG. 5.

In the processes of this invention, an exothermic reaction between the binder components starts naturally once water is added to the dry mix to form a slurry and the exothermic reaction heats the slurry. The reaction time can be controlled by many factors including total composition of slurry, percent (%) binder by weight in the slurry, the fillers in the slurry, the amount of water or other liquids in the slurry and the addition of a retarder such as boric acid to the slurry. Retarders slow down the reaction. Alternate retardants can include borax, sodium tripolyphosphate, sodium sulfonate, citric acid and many other commercial retardants common to the industry.

Figure 5:
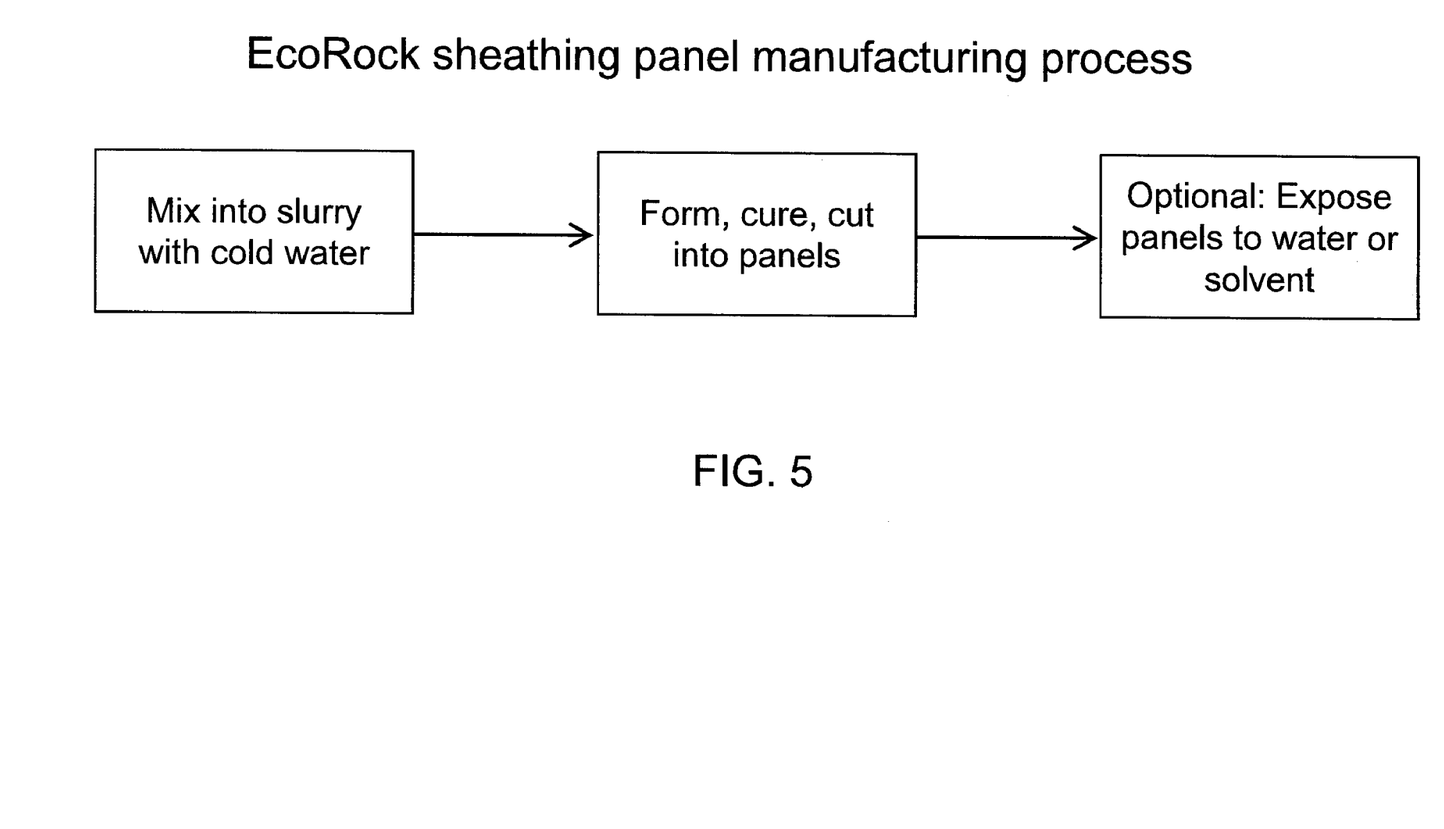
FIG. 5 shows the EcoRock sheathing panel manufacturing steps which require little energy.

FIG. 5 shows the simplicity of the two-step process of this invention: namely mixing the slurry with unheated water and then forming the wallboards from the slurry. An optional third step is shown in FIG. 5 wherein the third step involves dipping the wallboard produced in the second step into a liquid (water if the soluble fibers are water soluble) to remove the soluble fibers thereby to create the desired perm value for the sheathing panel. The actual perm value of the sheathing is a function of the number of soluble fibers, the lengths and diameters of the soluble fibers and the number of the soluble fibers which extend across the complete thickness of the panel. Only a fraction of the total number of soluble fibers will extend across the panel from one surface to the other surface and thereby affect the vapor transmission through the panel. When the soluble fibers which extend from one surface to the other surface of the panel are dissolved, the volume occupied by these fibers then is available to allow the transmission of vapor from one side to the other side of the panel. It should be recognized that even fibers which extend to only one surface of the panel will also be dissolved by the liquid. Some moisture will pass along the channels previously occupied by these fibers and will ultimately diffuse through the remaining portions of the panel to the opposite surface. However, the effect on the vapor transmissivity of the panel is small because the perm rating of the panel is basically controlled by the number of soluble fibers which extend from one surface to the other surface of the panel, for the number of soluble fibers in the slurry used to form the panel being in excess of ten thousand fibers per panel.

The third step in FIG. 5 can be avoided if the fibers added to the panel are hollow.

The wallboards can either be formed in molds or formed using a conveyor system of the type used to form gypsum wallboards and then cut to the desired size.

In the process of FIG. 5, the slurry starts thickening quickly, the exothermic reaction proceeds to heat the slurry and eventually the slurry sets into a hard mass. Typically maximum temperatures of 40° C. to 90° C. have been observed depending on filler content and size of mix. The hardness can also be controlled by fillers, and can vary from extremely hard and strong to soft (but dry) and easy to break. A range of suitable formulations with varied filler content is given in Table 2. Set time, the time necessary to achieve a slurry strength sufficient to remove the cured slurry (i.e."cement") from forming tanks, can be designed from twenty (20) seconds to days, depending on the additives or fillers. For instance, boric acid can extend the set time from seconds to hours where powdered boric acid is added to the binder in a range by weight of 0% (seconds) to 4% (hours). While a set time of twenty (20) seconds leads to extreme productivity, the slurry may begin to set too soon for high quality manufacturing, and thus the set time should be adjusted to a longer period of time typically by adding boric acid. The use of one and two tenths percent (1.2%) by weight of boric acid gives approximately a four minute set time.

TABLE 2

| Filler Material | Percentage filler by volume (%) | Final mixture strength (psi) per ASTM C109 |
| --- | --- | --- |
| Dualite Microspheres | 0% | 7000 |
|  | 1% | 3000 |
|  | 2% | 1625 |
|  | 3% | 1000 |
|  | 5% | 450 |
| Fillite 500 Microspheres | 0% | 7000 |
|  | 10% | 4500 |
|  | 20% | 2750 |

TABLE 2-continued

| Filler Material | Percentage filler by volume (%) | Final mixture strength (psi) per ASTM C109 |
| --- | --- | --- |
|  | 30% | 2000 |
|  | 40% | 900 |
| Perlite | 0% | 7000 |
|  | 3% | 3500 |
|  | 6% | 2000 |
|  | 9% | 1050 |
|  | 12% | 750 |

An exothermic reaction will begin almost immediately after removal of the slurry from the mixer and continue for several hours, absorbing most of the water in the slurry into the reaction. Boards can be cut and removed in less than 30 minutes, depending on handling equipment available. All of the water has not yet been used in the reaction, and some absorption of the water will continue for many hours. Within 24-48 hours, the majority of water has been absorbed, with some evaporation occurring as well. This can be accomplished on racks at room temperature with no heat required. Drying time will be faster at higher temperatures and slower at lower temperatures above freezing. Residual drying will continue to increase at higher temperatures, however it is not beneficial to apply heat (above room temperature) due to the need of the exothermic reaction to utilize the water that would thus be evaporated too quickly.

The resulting boards (the "finished product") have strength characteristics similar to or greater than the strength characteristics of gypsum sheathing panels, and can be easily installed in the field.

As a feature of this invention, the ratio of one binder component to the other binder component by weight can be varied to minimize the cost of materials. A combination of 10% of one binder ingredient to 90% of the other has been mixed demonstrating an acceptable exothermic reaction.

Figure 6:
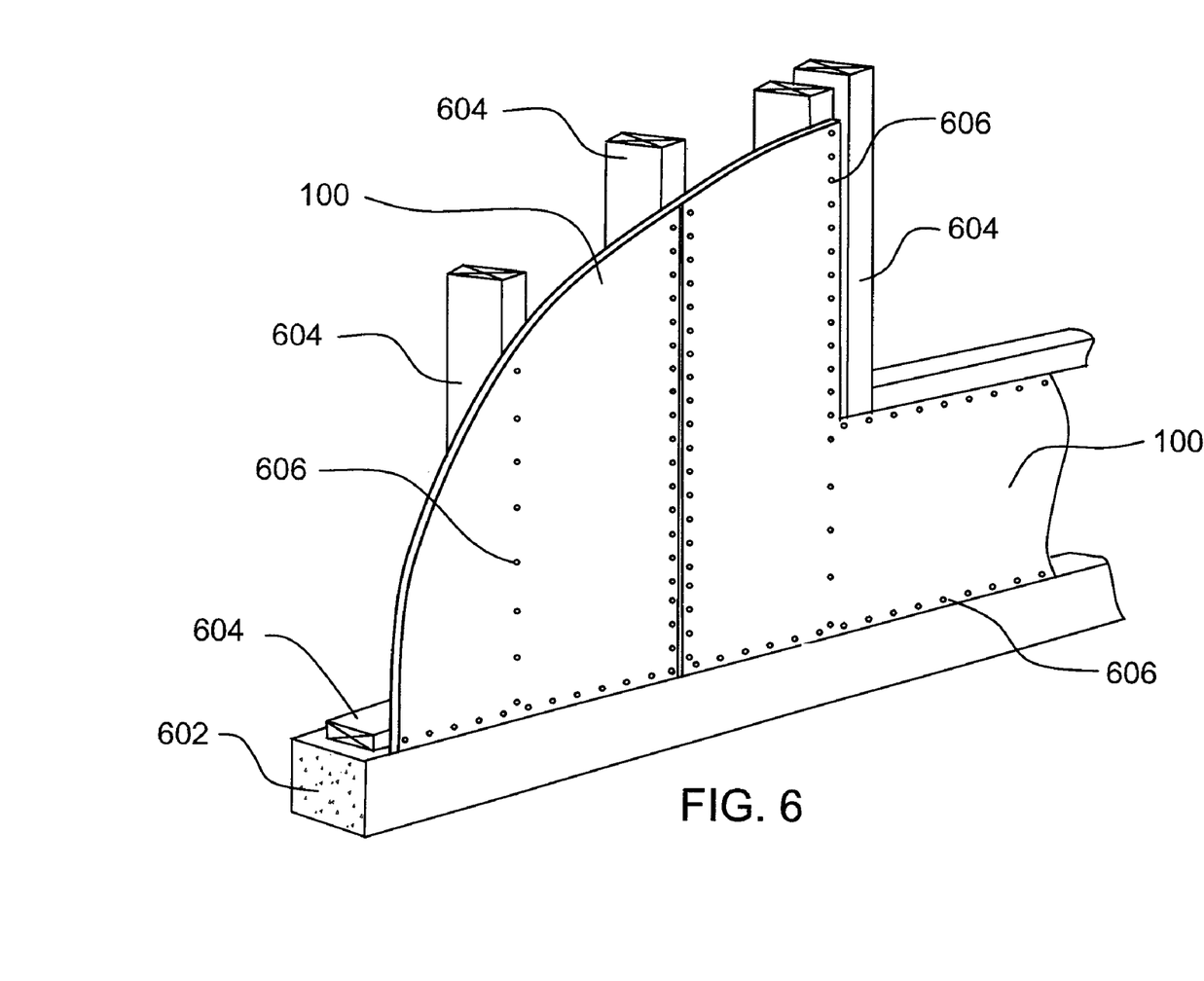
FIG. 6 shows the EcoRock sheathing panels 100 installed to framed structure.

As illustrated in FIG. 6, the EcoReock sheathing panel 100 is mounted is mounted to the building's structural framing 604. A typical concrete foundation 602 supports the framing 604, both constructed in a manner prescribed by the local or national building code. The EcoRock sheathing panel 100 is placed across the exterior face of the framing members 604 and fastened with mechanical fasteners 606 such as nails or screws. The specific type and spacing is determined by local or national building codes. For the purposes of clarity, the array of very small through pore or penetrations 102 across the face of the panel 100 are not shown in this figure.

Other embodiments of this invention will be obvious in view of the above disclosure.

What is claimed is:

1. A sheathing panel for use in construction, said panel having two surfaces, said panel comprising:
   a binder;
   fillers; and
   water soluble fibers extending from one surface to the other surface of said panel, thereby to allow vapor transmission through said panel.

2. The panel of claim 1 whereby said panel has a board-like core with a vapor transmission rate above about five (5) perms.

3. The sheathing panel of claim 1 wherein said binder comprises one or more of magnesium oxide (MgO), calcium oxide, calcium hydroxide, iron oxide (hematite or magnetite) and a solution of alkali phosphate salt.

4. The sheathing panel of claim 3 wherein said solution of alkali phosphate salt comprises one or more ingredients selected from the group consisting of sodium phosphate, potassium phosphate, monopotassium phosphate, tripotassium phosphate, triple super phosphate, calicium dihydrogen phosphate, dipotassium phosphate and phosphoric acid.

5. The sheathing panel of claim 1 wherein said binder comprises a mixture of monopotassium phosphate and magnesium oxide.

6. The sheathing panel of claim 5 wherein said magnesium oxide (MgO) may be calcined or uncalcined.

7. The sheathing panel of claim 1 wherein said fillers comprise one or more materials selected from the group consisting of calcium carbonate ($CaCO_3$), wolastinite (calcium silicate,) cornstarch, ceramic microspheres, perlite, flyash, waste products, and uncalcined gypsum.

8. The sheathing panel of claim 7 whereby said fillers are selected to give to the sheathing panel structural strength, acceptable weight so as to be able to be carried, water vapor permeability, and the ability to be nailed or otherwise attached to other materials such as studs.

* * * * *